Patented Dec. 26, 1939

2,184,575

UNITED STATES PATENT OFFICE 2,184,575

DRYING OINTMENT

Reinhard Beutner, Philadelphia, Pa., assignor to Parke, Davis & Company, Detroit, Mich., a corporation of Michigan No Drawing. Application March 24, 1937, Serial No. 132,719. In Germany August 21, 1933

11 Claims. (Cl. 167—63)

The present invention relates to the preparation of ointments of a novel type, that is, ointments which will dry and form an adherent film when applied to the surface of the skin.

The present application is a continuation in part of my copending application Serial No. 710,529, filed February 9, 1934, which has issued as Patent No. 2,097,439 on November 2, 1937.

It is the general object of the invention to provide an ointment which can carry in suspension medicaments of various kinds, particularly medicaments which are insoluble in the common solvents applicable for ointments, said ointment being capable of drying to a firmly adhering non-greasy and non-tacky film.

In general, my improved ointments are composed of a relatively insoluble, gel-like resinous or gummy substance substantially uniformly suspended in a solution of a solid resin in a volatile solvent, such as alcohol, ether, acetone, water, or mixtures of such solvents, and preferably a non-poisonous solvent, that is, one having no irritating effect on the skin or tissues. These ointments differ from all ointments known hitherto on account of this peculiar content of a volatile solvent in consequence of which, and of the more or less solid character of the body-producing component, they rapidly dry up when applied to the skin and leave a non-tacky, adherent film.

It is, of course, a well-known practice to add water, or possibly other solvents, to certain ointments, e. g. to lanoline, but, in this case the water-free portion is not solid; hence, the hydrated lanolin cannot dry upon the skin. In my new ointments described more in detail hereinbelow, the anhydrous constituent or vehicle forming material is quite solid, the salve-like consistency depending exclusively on the presence of a volatile solvent; hence they dry on the skin upon evaporation of the solvent.

The drying ointments according to the invention may be prepared in various ways, but in general the method of preparation involves the formation of a more or less uniformly distributed solid gelatinous or soft jelly-like precipitate or suspension in a solution, in a volatile solvent, of a material which acts as a protective colloid for the suspension and prevents the settling of the suspended material, the ointment being thus of stable character and having a jelly-like or semi-solid consistency and being capable of holding in uniform suspension medicaments and other substances which are insoluble in the volatile solvent.

While the gelled or suspended material, which forms the vehicle for the suspended medicament or the like, and the dissolved protective colloid material may be of many different kinds, I prefer to employ resinous materials both as the more or less solid or gel-like and the protective colloid, the resins or resinous condensates being either of different types or of the same type in different conditions of solubility. I have found mixtures of phenolic and urea resins to be excellently adapted for the production of drying ointments, either one of these resins acting as the protective colloid and the other being employed in the form of a gel or undissolved suspension which acts to thicken the mass. These resins are of especial advantage because they form adhering, flexible films, while the phenolic resins, and particularly phenol-formaldehyde resins, have the desirable property, as described in my above-mentioned application, of acting to produce analgesia and vaso-constriction when applied to the skin or tissues, and any of the methods of preparation of the resinous condensates described in such application may be employed in the manufacture of the drying ointment.

A satisfactory method of carrying out the present invention is as follows:

A liquid phenol-formaldehyde condensation product is first prepared in the presence of an alkaline condensing agent, like soda, etc., and a considerable excess of formaldehyde, viz. 3 times the required molecular amount. Instead of phenol any of its homologues may be used; or instead of formaldehyde any of its higher homologues, like acetaldehyde etc. Acetone may also be used in place of all or part of the formaldehyde. Such a mixture is first heated under reflux for half an hour to one hour. After the phenol and the aldehyde have thus been condensed most of the water of the formaldehyde solution, originally added, is evaporated at 100° or under vacuum at lower temperature. A liquid viscous mass is thus obtained which contains considerable free aldehyde and the alkaline condensing agent originally added. Now enough urea, or thio urea, is added to bind the free aldehyde. The mixture is again heated on the water bath to combine the urea with the aldehyde, the heating being conducted until a mass is obtained which is initially more or less entirely soluble in alcohol and leaves a solid film on drying, the heating being, however, stopped short of the insoluble or gel condition, as is well understood in this art. Thereafter the alkaline condensing agent may be neutralized or washed out, although this is not necessary. Alcohol, or another suitable solvent, is then added. This will, at first, dissolve the entire mass, forming a liquid. However, in a few hours or days the urea-aldehyde compound will slowly precipitate, transforming the solution into a salve, or a gel, the consistency being determined by the amount of alcohol employed, which may be varied between wide limits. The urea aldehyde compound, although it is insoluble in the alcohol, is held in fine suspension by the phenolic resin which acts as a protecting colloid. A permanent gelatinization is thus obtained. The ointment is non-flowing and semi-solid in nature, like butter, lanolin and petrolatum, and can keep insoluble medicaments in uniform suspension and dries quickly to a clean dry surface which will not soil clothing or the like, as is the case with known fatty ointments.

In place of the urea other substances may be added which are insoluble in the solution of the phenolic resin and slowly precipitate forming a soft gel-like mass gel. The above described method may be modified by adding the urea, etc. before the evaporation of the water. Or, the urea may be first condensed with the excess of aldehyde, and the phenol added thereafter. In this case a solvent mixture containing more water may be added, instead of alcohol; the phenolic resin now representing the insoluble gelatinizing constituent whereas the urea resin is water-soluble. Various emulsifying agents such as soaps, saponins, ethanolamines, may be added to these ointments in order to render them more homogeneous and stable. Also sodium salicylate, sodium benzoate or other alkali metal salts of organic acids may be used for that purpose. Any suitable plasticizer may be added to the mixture to the extent of about 10% of the mixture.

The following example illustrates a method of preparing an ointment in which a phenolic resin is suspended in insoluble or gel form in a solution of a urea resin.

200 parts by volume of liquefied phenol are mixed with 375 parts of a 40% formaldehyde solution, 5.1 parts by weight of anhydrous soda are added, the mixture heated under reflux at the boiling point and kept boiling for one hour. About 90% of the water of the originally added formaldehyde solution is then removed by distillation. To the thick resinous mass thus obtained, 110 parts of urea or thio-urea are added, and the mixture heated on a water bath for one hour in order to condense the urea with the free formaldehyde contained in the mixture. When this is completed the alkali is neutralized by any acid, preferably a weak acid, such as acetic or lactic; an excess of the acid may be added. In order to evaporate the remaining water the mass is again heated to about 110° C., care being taken not to overheat it since this would convert the resin into the insoluble state. The hot mass, which would be solid if cooled, is now mixed with an equal amount of alcohol to which up to 30% water is added. A liquid solution is first formed. After cooling it sets to a gel resembling petroleum jelly or lanolin, even though the evaporation of the alcohol is, of course, completely prevented.

The drying ointment thus prepared has therapeutic properties similar to those of other phenolic resins, being analgesic, vaso-constricting, anti-inflammatory and antiseptic as described in my above mentioned patent application Serial No. 710,529. Another factor of therapeutic importance is the solid protecting coat which the drying ointment will form.

The final heating should in every case be carefully done.

The drying ointments are different, however, from the liquid preparations described in application Serial No. 710,529, or from collodion, on account of their miscibility with practically any other material. For example, the drying ointment can be mixed with whole coal tar, whereas solutions of phenolic resin are miscible only with a small fraction of coal tar which is soluble in them. Furthermore, my drying ointment can be mixed with any grease or fat, like petroleum jelly or lanolin, whereas solutions of phenolic resins or collodion can be mixed only with a limited number of fats which dissolve in them, like castor oil.

In order to accelerate the mixing of the drying ointment with fat, glycol or glycolester, like the acetate, phthalate, etc., may be added.

The ointment of the present invention is of particular advantage, because of its rapid drying, for use with chrysarobin; neither phenolic resin solutions nor collodion will dissolve this intensely staining medicament. My new drying ointment very easily incorporates chrysarobin within it in a uniform and stable manner.

Another advantage of these composite drying ointments, made from phenols, ureas, and aldehydes, over the simple phenolic resins is that they are more nearly free from uncombined phenol because the excess of aldehyde combines with the phenol.

Alcohol soluble medicaments like most dyes, salicylic acid, iodine, etc., can easily be mixed with the drying ointment. In place of alcohol various other solvents may be used such as hydrocarbons, glycerin, glycol or their esters, various higher monobasic alcohols, acetone, various ethers or esters, or mixtures of any of these, whereby also water may be added.

The content of volatile solvent in these drying ointments averages 50%, but may amount to 10% to 90%. In spite of this high content of liquid the preparations are not liquid like collodion and consequently can be mixed with any ingredient, even with those which do not dissolve in them like zinc oxide, or other oxides, or with greases and fats like petroleum jelly, lanolin, etc., whereas collodion, or other liquid drying preparations, can be mixed only with those ingredients which will dissolve in them.

The ointments according to the invention can in general be employed for all purposes for which the colloidal solutions described in my above mentioned application can be used, including the use as an easily removable adhesive on tapes, plasters, and the like.

The term "ointment" as used in this specification and in the appended claims is intended to mean a semi-solid non-flowing material of the consistency of salves, or even more nearly solid, the consistency being similar to that of butter, lanolin, and petrolatum, at room temperatures; the preparation being thus capable of being smeared on the skin with the fingers to yield an adhering layer which may be of any desired thickness and will not flow off.

I claim:

1. A method of preparing a drying ointment which comprises forming a gell in a solution of a phenol-aldehyde resin by generating in such a resin, in the alcohol-soluble state, a urea-aldehyde resin which is alcohol-insoluble, adding alcohol to the mixture, and then allowing the solution to stand until the urea resin sets to a gel which remains suspended in the solution of the phenolic solution.

2. A method of preparing a drying ointment according to claim 1, including the step of adding a medicament to the mixture.

3. A drying ointment capable of producing analgesia and vaso-constriction when applied to the skin, and comprising a solution in a volatile solvent of a phenol-aldehyde condensation product whose condensation was arrested while it was still in the alcohol-soluble state, and a relatively insoluble resinous urea formaldehyde condensate suspended therein in stable form in sufficient quantity to impart a semi-solid consistency to the mass.

4. A method of preparing a drying ointment which comprises increasing the viscosity of a film-forming solution of a water-soluble urea-aldehyde resin by incorporating in such solution a phenol-aldehyde resin, adding water to the mixture and allowing the same to stand until the phenolic resin sets to a gel.

5. A drying, substantially non-separating ointment base capable of being spread as a continuous film upon the skin, comprising a solution, in a volatile solvent, of a film-forming material, and a substantially stable suspension, in such solution, of a material insoluble therein, one of said materials being a condensation product of a phenol and a member of the group consisting of aldehydes and ketones capable of forming resinous condensates with the phenol, and the other being a condensation product of a urea and an aldehyde, the proportion of solvent and of solid material being such that the preparation is of plastic, non-flowing consistency.

6. A drying ointment of non-flowing consistency and capable of being spread in the form of a continuous film upon the skin, said ointment comprising a precipitated condensate of a urea and an aldehyde suspended in a solution of a phenol-aldehyde resin in a volatile solvent in which the urea-aldehyde condensate is insoluble.

7. A drying ointment of semi-solid consistency and capable of being spread as a substantially uniform film upon the skin, and comprising a suspension of an undissolved urea-formaldehyde resin in a solution of a substantially solid phenol-formaldheyde condensate in a volatile organic solvent.

8. A drying ointment of semi-solid consistency and capable of being spread as a substantially uniform film upon the skin, and comprising a suspension of an alcohol-insoluble urea-formaldehyde resin in an alcohol solution of a substantially solid phenol-formaldehyde resin.

9. A drying ointment of semi-solid consistency and capable of being spread as a substantially uniform film upon the skin, and comprising a medicament distributed in a suspension of a urea-formaldehyde resin in a solution of a substantially solid phenol-formaldehyde resin in a volatile solvent in which the urea resin is insoluble.

10. A method of preparing a drying ointment which comprises condensing phenol and a molecular excess of formaldehyde in the presence of an alkaline catalyst until a soluble, resinous condensate is obtained, removing at least part of the water, adding a urea and heating the mixture to effect condensation of the urea and excess formaldehyde, but stopping short of the conversion of the phenolic condensate to the alcohol-insoluble state, neutralizing the catalyst, expelling water, adding alcohol to the resin mixture and allowing the urea-formaldehyde resin to precipitate out of the phenolic resin solution.

11. A method of preparing a drying ointment which comprises condensing a phenol and an aldehyde and a urea and an aldehyde to the resinous condition, the condensation being stopped before the phenol-aldehyde condensate reaches the alcohol-insoluble state, adding alcohol to a mixture of the two condensates, and allowing the urea-aldehyde resin to precipitate out of the phenol-aldehyde resin solution, the proportion of urea-aldehyde resin being such that the product has a soft, lanolin-like consistency.

REINHARD BEUTNER.